US012780632B2

(12) United States Patent
Synesael

(10) Patent No.: US 12,780,632 B2
(45) Date of Patent: Nov. 3, 2026

(54) REMOTE CONTROL SYSTEMS AND METHODS FOR A MATERIAL HANDLING VEHICLE

(71) Applicant: The Raymond Corporation, Greene, NY (US)

(72) Inventor: Alexander Synesael, Harpursville, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 19/200,317

(22) Filed: May 6, 2025

(65) Prior Publication Data

US 2025/0340417 A1 Nov. 6, 2025

Related U.S. Application Data

(60) Provisional application No. 63/643,216, filed on May 6, 2024.

(51) Int. Cl.
*B66F 9/075* (2006.01)

(52) U.S. Cl.
CPC ................................ *B66F 9/07581* (2013.01)

(58) Field of Classification Search
CPC ....... B66F 9/07581; B66F 9/24; G05D 1/223; G05D 2105/28; G05D 2107/70; G05D 2109/10; H02N 2/18; H04L 67/025; H04L 67/12
See application file for complete search history.

(56) References Cited

U.S. PATENT DOCUMENTS

| | | | | |
|---|---|---|---|---|
| 7,605,689 | B2 | 10/2009 | Hein et al. | |
| 9,779,898 | B2 | 10/2017 | Erdmann et al. | |
| 10,242,562 | B2 | 3/2019 | Steinmetz | |
| 10,755,552 | B2 * | 8/2020 | Skaaksrud | G01N 33/004 |
| 11,025,720 | B2 * | 6/2021 | Skaaksrud | G01N 33/004 |

(Continued)

FOREIGN PATENT DOCUMENTS

| | | | |
|---|---|---|---|
| CN | 201655004 | U | 11/2010 |
| WO | 2017039546 | A1 | 3/2017 |

OTHER PUBLICATIONS

European Patent Office, Extended European Search Report, Application No. 25174257.3, Oct. 6, 2025, 12 pages.

*Primary Examiner* — Bhavesh V Amin
(74) *Attorney, Agent, or Firm* — Quarles & Brady LLP

(57) ABSTRACT

A remote control system for a material handling vehicle includes a remote control device having a housing with an energy generating switch configured to generate electrical energy in response to actuation of the switch. The system includes an energy storage system to store the energy generated by actuation of the switch, a controller powered by the stored electrical energy and configured to generate commands for the material handling vehicle, a regulator configured to release a predetermined amount of energy from the energy storage system to power the controller, and a transceiver to transmit travel commands to the material handling vehicle while the electrical energy generated by actuation of the switch powers the controller. The transceiver ceases transmitting travel commands to the material handling vehicle when the electrical energy generated by actuation of the switch is depleted.

20 Claims, 6 Drawing Sheets

(56) References Cited

U.S. PATENT DOCUMENTS

| | | | |
|---|---|---|---|
| 12,138,977 | B2 | 11/2024 | Stanford et al. |
| 2002/0074898 | A1 | 6/2002 | Maue et al. |
| 2020/0080375 | A1 | 3/2020 | Girard et al. |
| 2020/0098241 | A1* | 3/2020 | Skaaksrud ........... G01N 33/004 |
| 2020/0143664 | A1* | 5/2020 | Skaaksrud ........... G01N 33/004 |
| 2021/0399204 | A1 | 12/2021 | Herfatmanesh et al. |
| 2025/0340417 | A1* | 11/2025 | Synesael ............. B66F 9/07581 |

* cited by examiner

REMOTE CONTROL SYSTEMS AND METHODS FOR A MATERIAL HANDLING VEHICLE

CROSS-REFERENCE TO RELATED APPLICATIONS

This application claims the benefit of U.S. Provisional Application No. 63/643,216, filed May 6, 2024, which is hereby incorporated by reference in its entirety.

BACKGROUND

Remote control systems may be used to control functions (e.g., travel, etc.) of a material handling vehicle via a remote control device. However, typical remote control devices utilize a fixed power source (e.g., a battery) to power the remote control device, which needs to be recharged or replaced.

SUMMARY

According to one aspect of the present disclosure, a remote control system for a material handling vehicle can include a remote control device having a housing including an energy generating switch configured to generate electrical energy in response to actuation of the switch. The system can include an energy storage system to store the energy generated by actuation of the switch. A controller can be powered by the stored electrical energy and configured to generate commands for the material handling vehicle. The system can include a regulator configured to release a predetermined amount of energy from the energy storage system to power the controller. A transceiver can transmit travel commands to the material handling vehicle while the electrical energy generated by actuation of the switch powers the controller, and the transceiver can cease transmitting travel commands to the material handling vehicle when the electrical energy generated by actuation of the switch is depleted.

In some examples, the energy generating switch can be a piezoelectric switch.

In some examples, the energy storage system can be a capacitor bank.

In some examples, the system can further include a non-energy generating switch, actuation of the non-energy generating switch to send a stop command from the transceiver to the material handling vehicle.

In some examples, the regulator can release the predetermined amount of energy at a predetermined time interval.

In some examples, the controller can be configured to generate travel commands for the material handling vehicle in response to a first actuation of the energy generating switch.

In some examples, the controller can be configured to generate stop commands for the material handling vehicle in response to a second actuation of the energy generating switch while the material handling vehicle is moving.

In some examples, when the transceiver ceases to transmit travel comments, the material handling vehicle can automatically stop traveling.

In some examples, a single actuation of the energy generating switch can generate sufficient electrical energy to power the remote control device for a time period of between 10 seconds and 15 seconds.

In some examples, the remote control device can be configured to transmit redundant packets for each command sent to the material handling vehicle.

According to another aspect of the present disclosure, a method of controlling a material handling vehicle can include generating electrical energy in a remote control device by actuating an energy generating switch. The method can include storing the generated electrical energy in an energy storage system. The method can include powering a controller with the stored electrical energy to generate commands for the material handling vehicle. The method can include transmitting the commands to the material handling vehicle via a transceiver in communication with the controller. In response to receiving the commands, the method can include moving the material handling vehicle. The method can include ceasing to transmit the commands when the energy storage system is depleted. In response to ceasing to transmit the commands, the method can include automatically stopping the material handling vehicle.

In some examples, the energy generating switch can be a piezoelectric switch.

In some examples, the method can further include releasing a predetermined amount of energy from the energy storage system to power the controller and transceiver at a predetermined time interval.

In some examples, generating commands can include generating travel commands for the material handling vehicle in response to a first actuation of the energy generating switch.

In some examples, the method can further include generating stop commands for the material handling vehicle in response to actuation of a second switch on the remote control device.

In some examples, the second switch can be a non-energy generating switch.

According to yet another aspect of the present disclosure, a remote control system for a material handling vehicle can include a remote control device with an energy generating switch, the switch to generate electrical energy upon actuation. The system can include an energy storage system that stores the electrical energy generated by actuation of the switch. A controller can be powered by the electrical energy stored in the energy storage system. The controller can transmit travel commands at a first predetermined time interval to travel the material handling vehicle when energy remains in the energy storage system. The controller can cease transmitting travel commands when the energy in the energy storage system is depleted. The material handling vehicle can be configured to automatically stop when the energy storage system is depleted and the controller ceases to transmit travel commands for a second predetermined time interval.

In some examples, the second predetermined time interval can be about two times greater than the first predetermined time interval.

In some examples, the controller can transmit stop commands to the material handling vehicle in response to actuation of a second switch on the remote control device.

In some examples, the remote control device can be configured to transmit redundant packets for each command sent to the material handling vehicle.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
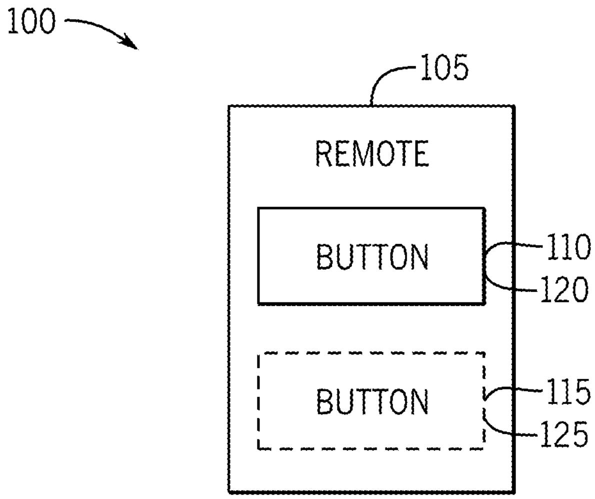
FIG. 1 is a diagrammatic view of a remote control according to aspects of the present disclosure.

The following discussion is presented to enable a person skilled in the art to make and use embodiments of the invention. Given the benefit of this disclosure, various modifications to the illustrated embodiments will be readily apparent to those skilled in the art, and the principles herein can be applied to other embodiments and applications without departing from embodiments of the invention. Thus, embodiments of the invention are not intended to be limited to embodiments shown, but are to be accorded the widest scope consistent with the principles and features disclosed herein.

The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

It is also to be appreciated that material handling vehicles are designed in a variety of classes and configurations to perform a variety of tasks. It will be apparent to those of skill in the art that the present disclosure is not limited to any specific material handling vehicle, and can also be provided with various other types of material handling vehicle classes and configurations, including for example, lift trucks, forklift trucks, reach trucks, SWING REACH® vehicles, turret trucks, side loader trucks, counterbalanced lift trucks, pallet stacker trucks, order pickers, transtackers, tow tractors, and man-up trucks, and can be commonly found in warehouses, factories, shipping yards, and, generally, wherever pallets, large packages, or loads of goods can be required to be transported from place to place. The various systems and methods disclosed herein are suitable for any of operator controlled, pedestrian controlled, remotely controlled, and autonomously controlled material handling vehicles. Further, the present disclosure is not limited to material handling vehicles applications. Rather, the present disclosure may be provided for other types of vehicles, such as automobiles, buses, trains, tractor-trailers, farm vehicles, factory vehicles, and the like.

It should be noted that the various material handling vehicles listed above may perform a variety of load handling functions. For example, the material handling vehicles and/or the load handling portion (e.g., forks, mast, and/or fork carriage, etc.) of the material handling vehicles may be operated to move the forks up and down, tilt, reach (e.g., move the forks in and out), rotate, travel (e.g., move the material handling vehicle), and/or any combination thereof to complete a load handling function.

As should be noted, for certain types of vehicles there are training requirements imposed by various government agencies, laws, rules and regulations. For example, OSHA imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

In one example, a remote control system for operating a material handling vehicle (MHV) may include a remote control device having one or more buttons. The one or more buttons may be configured to actuate one or more switches configured to generate a predetermined amount of energy per switch actuation. In one particular example, the remote control device may include a single button configured to actuate the energy generating switch (e.g., a piezo electric switch, an electromagnetic switch, a snap-action switch, a magnetic switch, or any other known energy generating switch).

In one example, the remote control device may further include an energy storage system (e.g., a capacitor bank, a battery, a supercapacitor, or any other energy storage device) configured to receive and retain the energy generated by the activation of the switch. The energy storage system may release predetermined amounts of energy (e.g., electrical energy) from the energy storage system to a controller via a regulator (e.g., a voltage regulator). The regulator may be configured to release a predetermined amount of energy needed to power the controller to send at least one single discreet command via a transceiver to the material handling vehicle in order to command the material handling vehicle to travel (e.g., move) or stop travel (e.g., stop), or to control other functions of the material handling vehicle.

Thus, the remote control device is able to self-generate the electrical power needed to operate the remote control, which is in turn able to control one or more functions of the material handling vehicle. As a result, the remote control device does not utilize an external power source (e.g., batteries, power cord, etc.), which reduces the possibility of the remote control device losing charge or "dying" during a work shift.

FIG. 1 illustrates an example of a remote control 100 for use with a material handling vehicle (MHV). In one example, the remote control 100 may include a housing 105 having a first button 110. In one particular example, the first button 110 may actuate a switch 120 in response to actuation of the button 110 (e.g., by an operator). The switch 120 may be configured to generate energy (e.g., an electrical charge) that may be stored or used by the remote control 100 to power the remote control 100, without the need for an external power source (e.g., a power cord, battery, etc.). For example, the switch 120 may be a piezo electric switch, an electromagnetic switch, a snap-action switch, a magnetic switch, or any other known energy generating switch.

In another example, the remote control 100 may include a second button 115, which may actuate a second switch 125 in response to actuation of the button 115. However, in some examples, the second switch 125 may not generate energy and may be in the form of a traditional push-button switch. Put differently, the remote control 100 may include both a first button 110 and a second button 115, with only the first button 110 including an energy generating switch 120. In yet another example, both the first button 110 and the second button 115 may include switches configured to generate energy in response to actuation of the buttons 110, 115. Additional buttons may be included that may or may not be configured to generate energy in response to their actuation.

In one particular example, the remote control 100 may include only a single button 110 including the energy generating switch 120. For example, the button 110 may be configured to generate energy via the switch 120 to power the remote control 100 to send a command or instructions to a material handling vehicle. For example, an operator may press or actuate the button 110 to send a command from the remote control 100 to the material handling vehicle to travel (e.g., move) or to stop travel (e.g., stop movement) of the material handling vehicle. In another example, an operator may press or actuate the second button 115 to send a discreet stop command from the remote control 100 to the material handling vehicle to stop travel (e.g., stop movement) of the material handling vehicle.

In some examples, the remote control 100 may be configured to pair with the material handling vehicle wirelessly. For example, the remote control 100 may pair to a material handling vehicle using near-field communication (NFC). In other examples, the remote control 100 may pair to the material handling vehicle via radio-frequency identification (RFID), Bluetooth (e.g., Bluetooth Low Energy (BLE), Zigbee, or any other known wireless communication architecture.

Figure 2:
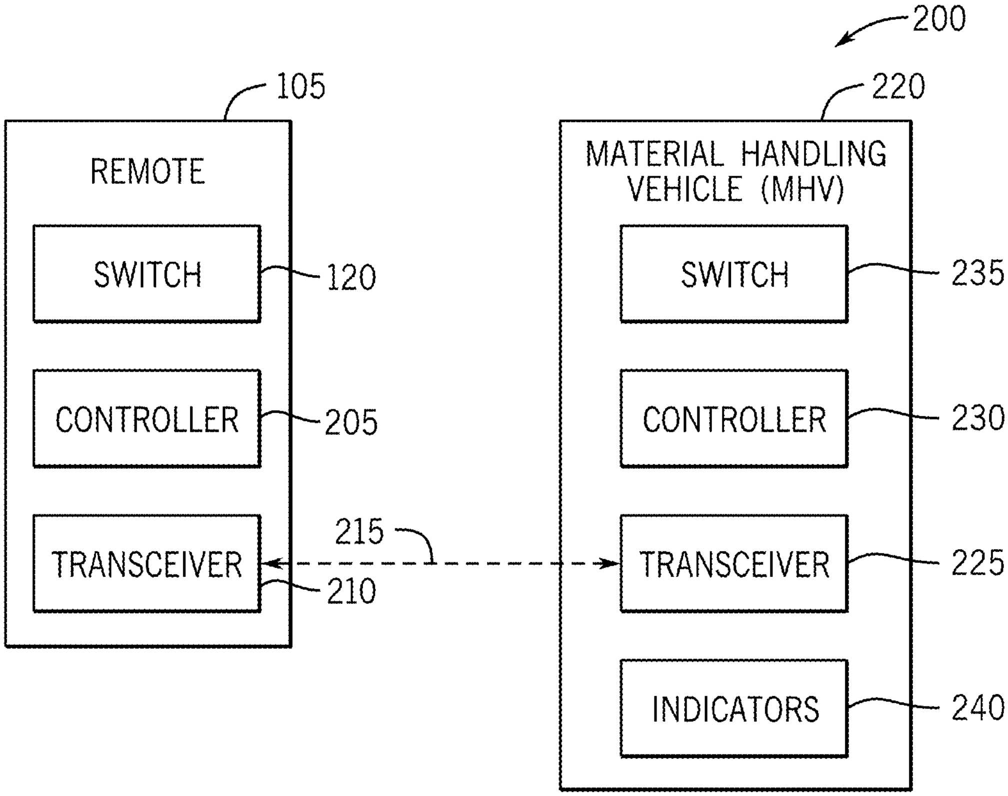
FIG. 2 is a diagrammatic view of a remote control system including the remote control of FIG. 1 according to aspects of the present disclosure.

Turning to FIG. 2, an example of a remote control system 200 using the remote control 100 to communicate (e.g., send commands or instructions) from the remote control 100 to a material handling vehicle 220 is shown. As discussed previously, the remote control 100 may include a switch 120 actuated by the button 110. In one example, the switch 120 generates a predetermined amount of energy (e.g., electrical energy) in response to a singular press of the button 110. In another example, the energy generated by a singular press of the button 110 (corresponding to a single actuation of the switch 120) is configured to power the remote control 100 to send one or more discreet commands (e.g., travel commands) from the remote control 100 to the material handling vehicle 220. It is to be appreciated that more than one press is contemplated, and that sending more than one discreet command is also contemplated.

In one example, the energy generated from actuation of the switch 120 generates enough energy to power a controller 205 for a predetermined time interval used to generate and send commands from the controller 205 via a transceiver 210. However, in other examples, instead of using the transceiver 210, the remote control 100 may instead utilize separate receivers, transmitters, or any combination thereof. In one example, the transceiver 210 may be separate from, but in electrical communication with the controller 205. In another example, the transceiver 210 may be integrated into the controller 205.

The transceiver 210 of the remote control 100 may be in communication with a transceiver 225 of the material handling vehicle 220 via a communication link 215. However, in other examples, instead of using the transceiver 225, the material handling vehicle 220 may instead utilize separate receivers, transmitters, or any combination thereof. In one example, the communication link 215 may be Bluetooth Low Energy (BLE) communication. In other examples, the communication link 215 may be radio communications (e.g., via the 915 MHz industrial, scientific, and medical (ISM) band), Bluetooth communications, near field communications, Zigbee, a Wi-Fi connection, cellular, or any other known wireless communication method.

As mentioned previously, the material handling vehicle 220 may operate in response to instructions or commands received from the remote control 100. For example, the material handling vehicle 220 may receive instructions or commands from the remote control 100 via the transceiver 225, which may be transmitted to a controller 230 of the material handling vehicle 220 through a controller area network (CAN) bus. In one example, the controller 230 may be in the form of a motor control unit (MCU) or an electronic control unit (ECU) configured to facilitate operation of a drivetrain 235 of the material handling vehicle 220. For example, the controller 230 may instruct the drivetrain 235 to cause the material handling vehicle 220 to travel (e.g., ramp up one or more motors of the drivetrain) gradually until reaching a defined target speed (e.g., 3 MPH, etc.) based on one or more instructions received from the remote control 100.

In another example, the controller 230 may instruct the drivetrain 235 to stop travel or stop movement of the material handling vehicle 220 based on one or more instructions received from the remote control 100. For example, the controller 230 may instruct the drivetrain 235 to stop travel or stop movement of the material handling vehicle 220 (e.g., ramp down one or more motors of the drivetrain) gradually until reaching a defined target speed (e.g., 0 MPH, etc.) based on one or more instructions received from the remote control 100. In yet another example, the controller 230 may instruct the drivetrain 235 to stop travel or stop movement (e.g., enter an idle state) of the material handling vehicle 220 based on not receiving instructions from the remote control 100 within a predetermined time period.

Figure 3:
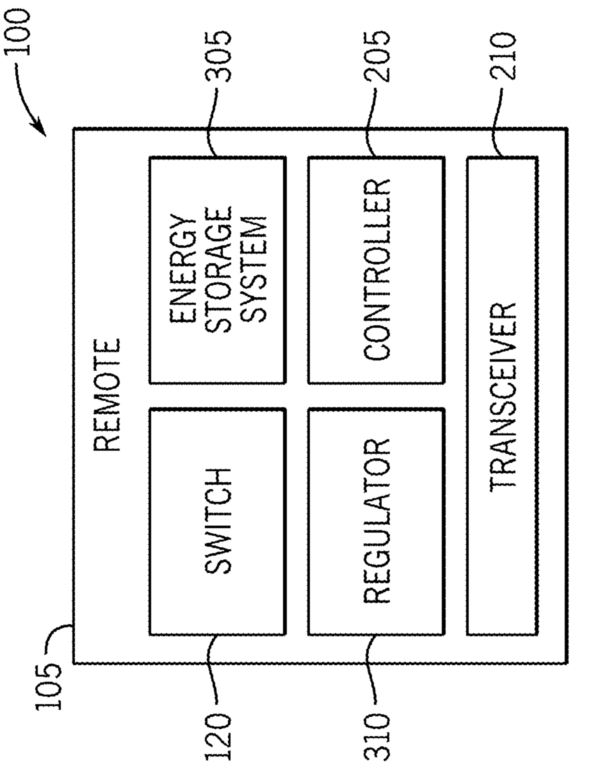
FIG. 3 is a diagrammatic view of the remote control of FIG. 1 according to aspects of the present disclosure.
Figure 4A:
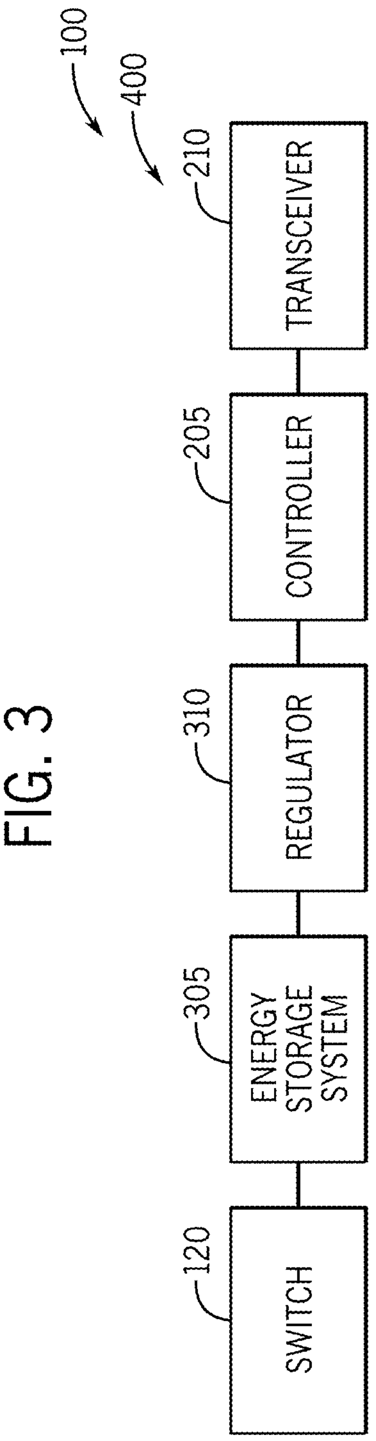
FIG. 4A is a diagrammatic view of a wiring diagram of the remote control of FIG. 1 according to aspects of the present disclosure.
Figure 4B:
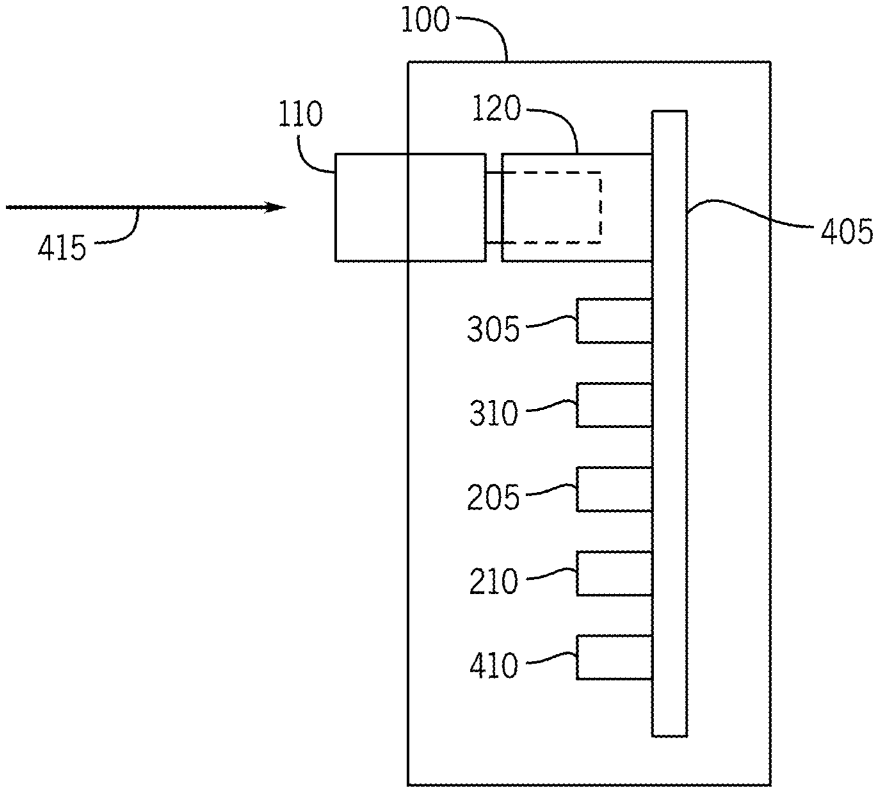
FIG. 4B is a diagrammatic view of the remote control of FIG. 1 according to aspects of the present disclosure.

FIGS. 3, 4A, and 4B show an example of the remote control 100 including an example wiring diagram 400 showing example connections of internal components of the remote control 100. As discussed previously, the remote control 100 may include the switch 120, which may generate a predetermined amount of energy in response to a single actuation of the button 110 (e.g., as shown by arrow 415). In one example, the switch 120 may generate a greater amount of energy via a single actuation than is needed to power the controller 205 to send a single instruction or command to the material handling vehicle 220. For example, the switch 120 may generate enough energy to power the remote control 100 for a period of about 10 seconds to about 15 seconds, or more or less, under normal operating conditions, after which the material handling vehicle 220 may automatically stop operation. As should be appreciated, the remote control 100 may send periodic commands throughout the time interval (e.g., send a command about every 10 milliseconds to about every 90 milliseconds, or more or less).

In one example, to capture the additional energy generated via actuation of the switch 120, energy from actuation of the switch 120 may be transmitted into an energy storage system 305. In one example, the energy storage system 305 may be in the form of a capacitor bank, a battery, a supercapacitor, or any other energy storage device.

In one example, a regulator 310 may be positioned downstream of the energy storage system 305. The regulator 310 may release a predetermined amount of energy from the energy storage system 305 corresponding to an amount of energy needed to power the controller 205 and transceiver 210 to send a single discreet command via the transceiver 210. In some examples, a single discreet command may include one or more packets for redundancy purposes. For example, the controller 205 may send two (2) packets back-to-back per each actuation of the switch 120. In other examples, the controller 205 may only second a single (e.g., one) packet per actuation of the switch 120. In one example, the regulator 310 may be in the form of a voltage regulator programmed to transmit a predetermined amount of voltage from the energy storage system 305 to power the controller 205. In another example, the regulator 310 may be programmed to release the predetermined amount of energy from the energy storage system 305 to the controller 205 at a predetermined time interval (e.g., about every 50 milliseconds, less than every 90 milliseconds, etc.).

In some examples, the regulator 310 may transmit the amount of energy needed to power the controller 205 from the energy storage system 305 to the controller 205 once per time interval until the energy stored in the energy storage system 305 is depleted. Thus, the remote control 100 may continue to send commands (e.g., travel commands) throughout the predetermined time interval to continue movement of the material handling vehicle during the predetermined time interval. However, once the energy stored in the energy storage system 305 is depleted, the remote control 100 may cease sending periodic commands to the material handling vehicle 220, which may cause the material handling vehicle to stop operation (e.g., in response to no longer receiving commands within a time interval). In some examples, the time interval can be about 2 times the time interval of commands sent to the material handling vehicle).

As should be appreciated, in some examples, the switch 120, controller 205, transceiver 210, energy storage system 305, regulator 310, and a load 410 (e.g., an electrical load) can all be positioned on a circuit board 405 (e.g., a printed circuit board) or on multiple circuit boards 405.

Figure 5:
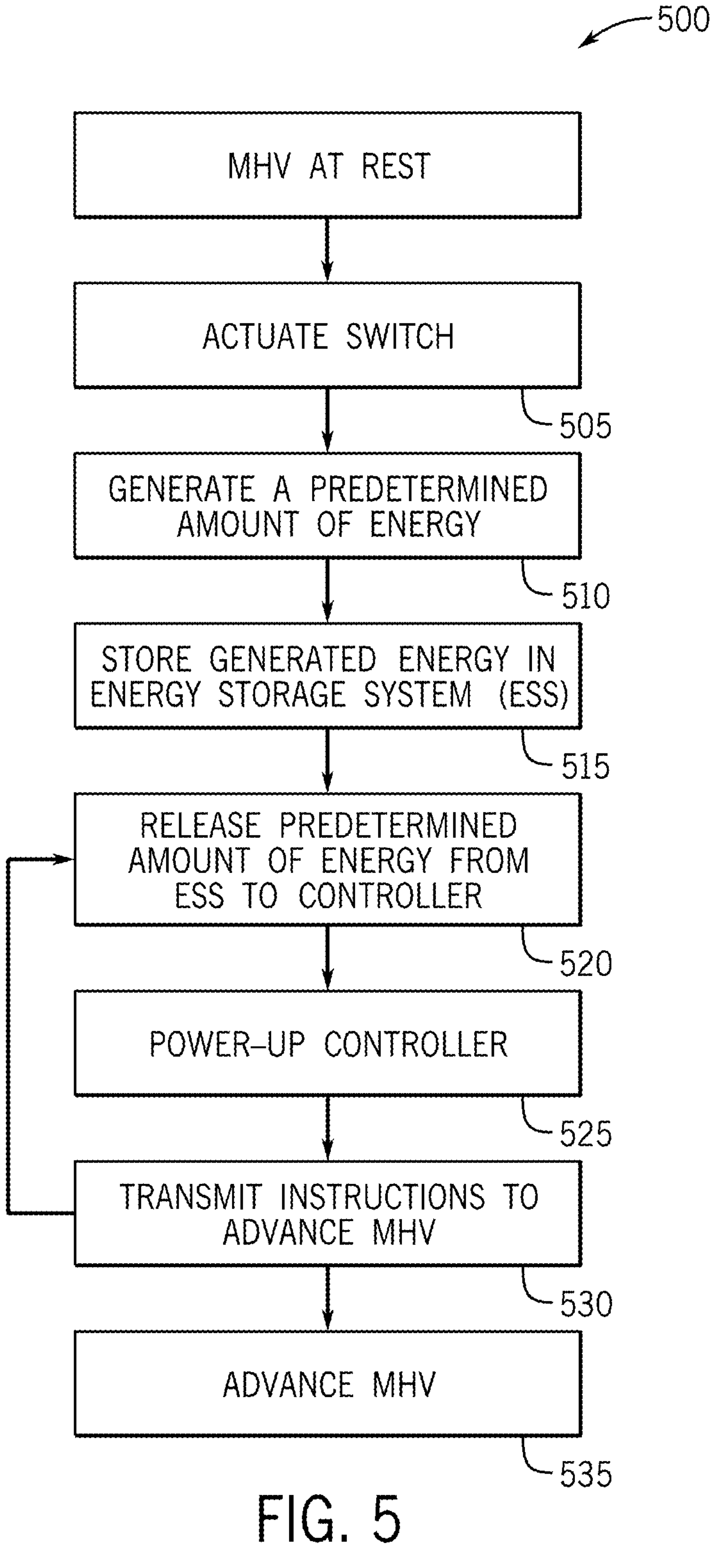
FIG. 5 is a flowchart of a travel function using the remote control of FIG. 1 according to aspects of the present disclosure.

FIG. 5 shows an example illustration of an travel function 500 using the remote control 100 to control a function of the material handling vehicle 220. For example, at stage 505, an operator may actuate the switch 120 via actuation of the button 110 of the remote control 100. At stage 510 actuation of the switch 120 (e.g., via the button 110) may generate a predetermined amount of energy (e.g., electrical energy), which may be transmitted to the energy storage system 305 at stage 515. At stage 520 the regulator 310 may release a predetermined amount of energy from the energy storage system 305 to the controller 205. At stage 525, the controller 205 may receive the energy, which corresponds to an amount of energy needed to power the controller 205 to send a singular discreet command (e.g., a pair of redundant packets, etc.) from the transceiver 210 of the remote control 100 to the transceiver 225 of the material handling vehicle 220 at stage 530. As mentioned previously, the regulator 310 may release the predetermined amount of energy from the energy storage system 305 based on the predetermined time interval so that the controller 205 sends periodic commands (e.g., based on the predetermined time interval) to the material handling vehicle 220.

In one example, the commands sent from the transceiver 210 of the remote control 100 correspond to travel commands configured to move the material handling vehicle 220 at stage 535. In one particular example, the regulator 310 may continue to send energy to the controller 205, which continues to send instructions to the material handling vehicle 220 via the transceiver 210 to continue travel of the material handling vehicle 220. In one particular example, a single actuation of the switch 120 may generate enough energy to send instructions to the material handling vehicle 220 for a total time of about 10 seconds before depleting the energy stored within the energy storage system 305. However, in other examples, a single actuation of the switch 120 may generate enough energy to send instructions to the material handling vehicle 220 for a total time of 30 seconds or less before depleting the energy stored within the energy storage system 305. As should be appreciated, once the energy stored within the energy storage system 305 is depleted, the material handling vehicle 220 may no longer receive travel commands (e.g., packets) from the remote control 100. In some examples, if the material handling vehicle (e.g., via the transceiver 225) does not receive commands from the remote control 100 within a time interval that is about two (2) times the predetermined time interval, the material handling vehicle may automatically cease travelling.

Figure 6:
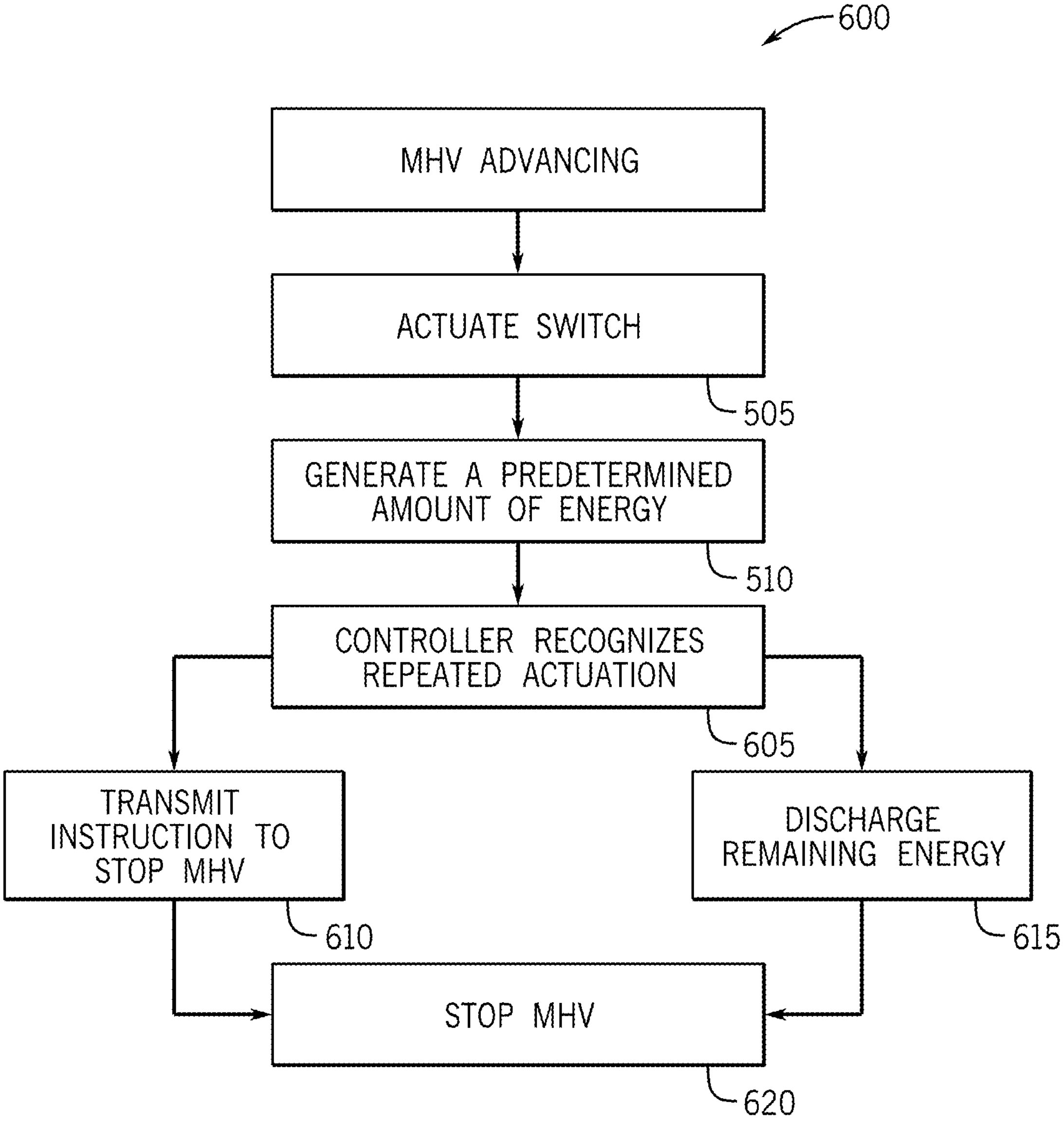
FIG. 6 is a flowchart of a stop function using the remote control of FIG. 1 according to aspects of the present disclosure.

FIG. 6 shows an example illustration of a stop function 600 using the remote control 100 to control a function of the material handling vehicle 220. For example, to stop travel or movement of the material handling vehicle 220, an operator may perform stages 505 and 510 as discussed previously (e.g., actuate the switch 120). For example, the operator may actuate the switch 120, which may generate the predetermined amount of energy. At stage 605, the controller may recognize the influx of energy (e.g., electrical energy) due to the actuation of the switch 120. In one example, at stage 610, in response to a second actuation of the button, while the material handling vehicle 220 is traveling, the controller may generate a second command or instruction from the transceiver 210. In one example, the second command (e.g., corresponding to the second press of the button 110) may stop travel or stop movement of the material handling vehicle at stage 620.

Additionally or alternatively, at stage 615, in response to the second press of the button 110, the controller may discharge all of the remaining energy stored in the energy storage system 305 (e.g., into a load 410, see, e.g., FIG. 4B), which may prevent the controller from sending travel commands. Thus, as the material handling vehicle is no longer receiving travel commands, the material handling vehicle may stop traveling. As should be appreciated, the material handling vehicle may be configured to automatically halt traveling (e.g., stop) when communication between the remote control 100 and the material handling vehicle is lost. For example, if the remote control 100 is unpowered, outside of the communication range, or otherwise non-operational (e.g., not sending travel commands) the material handling vehicle 220 may slow down, stop movement, and enter an idle state.

Put differently, with respect to FIGS. 5 and 6, when the material handling vehicle 220 is at rest (e.g., not moving or traveling) and an operator actuates the switch 120 via the button 110, the transceiver 210 may send a command to the material handling vehicle 220 to move the material handling vehicle 220. Correspondingly, when the material handling vehicle 220 is traveling or moving and the operator actuates the switch 120 via the button 110, the transceiver 210 may send a command to the material handling vehicle 220 to halt travel the material handling vehicle 220, regardless of the amount of energy remaining in the energy storage system 305. However, in another example, when the material handling vehicle 220 is traveling or moving and the operator actuates the switch 120 via the button 110, the transceiver 210 may begin to send stop or halt commands to the material handling vehicle 220 at the predetermined time interval until the energy storage system 305 runs out of power. In yet another example, when the material handling vehicle 220 is traveling or moving and the operator actuates the switch 120 via the button 110, the energy stored in the energy storage system 305 may be discharged into a load within the remote control 100, which drains the remote control 100 of energy and ceases to send travel commands to the material handling vehicle at the predetermined interval, which stops the vehicle as described previously.

Figure 7:
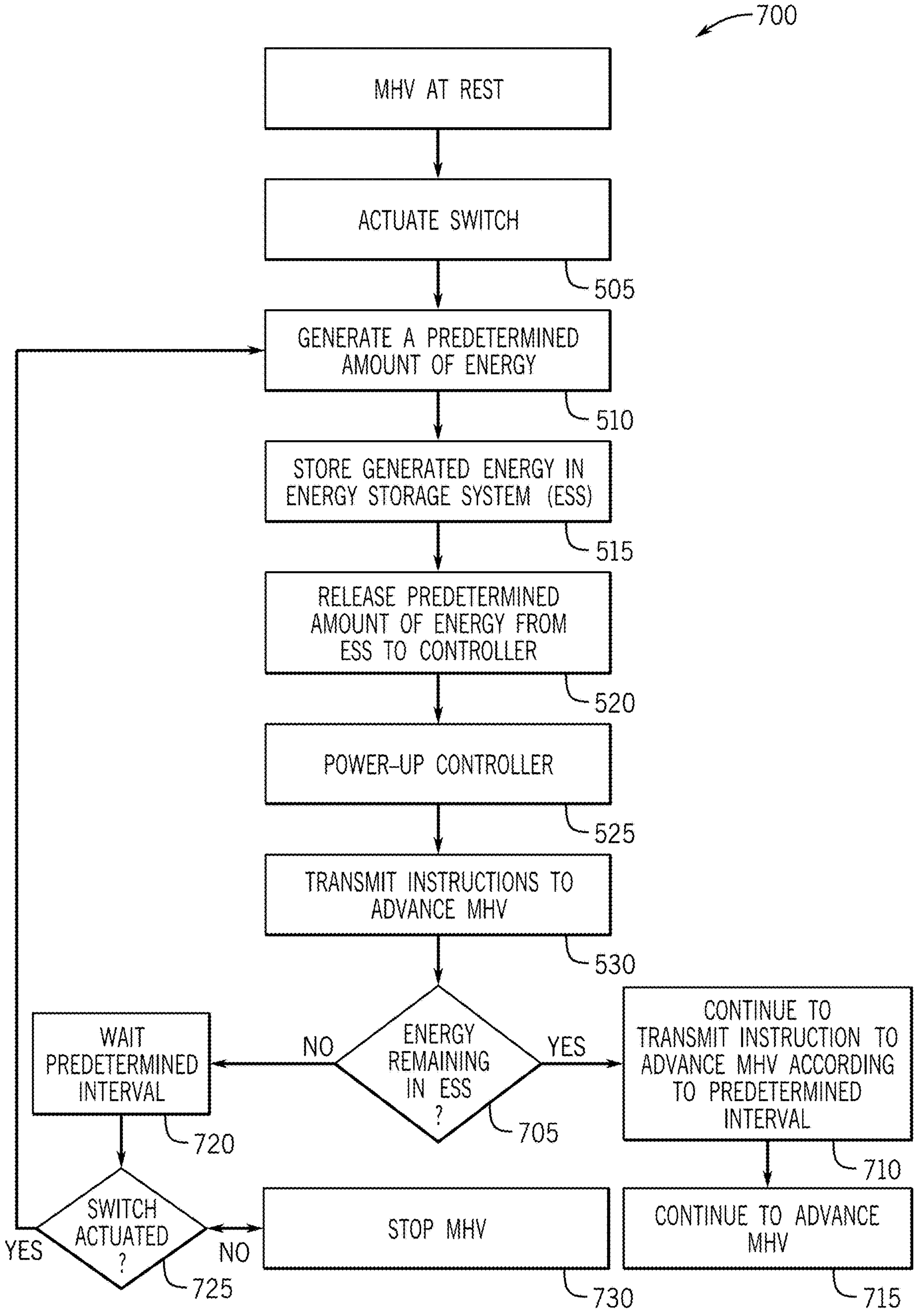
FIG. 7 is a flowchart of an automatic stop function using the remote control of FIG. 1 according to aspects of the present disclosure.

Turning to FIG. 7, an example illustration of an automatic stop function 700 is shown, which may be integrated into the material handling vehicle 220. For example, to move the material handling vehicle 220, an operator may perform stages 505 to 530 (e.g., as discussed previously). In some examples, the operator may perform stages 505 to 530 while the material handling vehicle 220 is at rest to begin to move the material handling vehicle 220. However, at stage 705, the controller 205 may determine whether or not there is stored energy remaining in the energy storage system 305. At stage 710, if there is still energy remaining in the energy storage system (ESS) 305, the controller 205 continues to send instructions via the transceiver 210 at a first predetermined time interval to continue to move the material handling vehicle 220 at stage 715. In some examples, the material handling vehicle 220 may send an acknowledgement via the transceiver 225 to the transceiver 210 to acknowledge receipt of the travel instructions.

In another example, if there is no longer energy remaining in the energy storage system, the controller 205 may wait a second predetermined time interval (e.g., about 2 times the interval described in stage 710) at stage 720. If at stage 725, the switch 120 is actuated (e.g., depressed) during the second predetermined time interval, the controller 205 powers the transceiver 210 to send travel instructions to the material handling vehicle 220 as described in stages 510 to 530. However, if at stage 725 the switch 120 is not actuated during the second predetermined time interval, the material handling vehicle 220 may automatically stop movement or traveling at stage 730. For example, the material handling vehicle 220 may automatically stop movement due to the energy storage system 305 running out of energy to send commands to the material handling vehicle 220 from the remote control 100. In another example, rather than waiting the second predetermined time interval at stage 720, the material handling vehicle 220 may automatically stop movement once the energy storage system is out of energy and ceases to send travel commands (e.g., once the remote control 100 is unpowered).

In some examples, the material handling vehicle 220 may perform the automatic stop function 700 gradually. For example, the material handling vehicle 220 may decelerate gradually to a complete stop (e.g., an idle state). For example, the controller 230 may gradually ramp down the speed of one or more motors of the drivetrain 235. Further, once the material handling vehicle 220 reaches a complete stop, the controller 230 may engages an electronic brake (e.g., a parking brake) to hold the material handling vehicle in position. In some examples, this gradual deceleration can mitigate more abrupt braking, which may result in load instability (e.g., load shifting, or the like). In some examples, when braking (e.g., stopping travel), the material handling vehicle 220 may utilize one or more indicators (e.g., audible indicators, flashing lights, etc.) to notify operators that the material handling vehicle 220 is stopping travel.

In some examples, the automatic stop function 700 may be activated upon detection of a disruption, disconnection, etc. between the remote control 100 and the material handling vehicle 220. In one example, the idle state may be activated when the energy generated by actuating the switch 120 is depleted without subsequent button actuation and no energy remains in the energy storage system. In another example, the idle state may be activated in the event of radio frequency (RF) disruption between the remote control 100 and the material handling vehicle 220. In yet another example, the idle state may be activated when the remote control 100 moves out of communication range of the material handling vehicle 220.

In one example, the automatic stop function 700 may be overridden to resume travel of the material handling vehicle 220 by actuating the switch 120 during the stop process. For example, actuation of the switch 120 may cause the controller 230 to send a command via the transceiver 210 to the material handling vehicle 220 drivetrain 235 to move the material handling vehicle 220 gradually (e.g., ramp up speed of one or more motors) until reaching a defined target speed (e.g., about 3 MPH). In one example, the drivetrain 235 may maintain the material handling vehicle 220 at the target speed as long as the remote control 100 continues to send travel commands. In some examples, to continue movement of the material handling vehicle 220, the operator may continue to actuate the switch 120. Put differently, each actuation of the switch 120 by the operator can reset an internal communication timer in the controller 205 and maintain the operation (e.g., travel) of the material handling vehicle 220. In some examples, the material handling vehicle may utilize one or more indicators 240 (e.g., audible indicators, flashing lights, etc.) to notify the operators when starting travel (e.g., movement).

In some examples, the remote control 100 may be operated to control additional functions of the material handling vehicle 220. For example, the remote control 100 may be operated to activate an audible signal (e.g., a horn) of the material handling vehicle 220. In another example, the remote control 100 may be operated to activate one or more lighting elements of the material handling vehicle 220. In yet another example, the remote control 100 may be operated to control the various parts of the material handling vehicles (e.g., raising or lowering the forks, etc.).

In some examples, the remote control 100 may be configured to generate energy sufficient to power the remote control 100 to transmit broadcast packets including identifying information (e.g., location information, etc.). Thus, in some examples, signal receivers within a warehouse (e.g., containing the material handling vehicle) may receive the broadcast packets and determine the location of the material handling vehicle 220, operator, remote control, etc.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

Further Examples

Example 1. A remote control system for a material handling vehicle, comprising: a remote control device having a housing including an energy generating switch configured to generate electrical energy in response to actuation of the switch; an energy storage system to store the energy generated by actuation of the switch; a controller powered by the stored electrical energy and configured to generate commands for the material handling vehicle; a regulator configured to release a predetermined amount of energy from the energy storage system to power the controller; and a transceiver to transmit travel commands to the material handling vehicle while the electrical energy generated by actuation of the switch powers the controller, and the transceiver to cease transmitting travel commands to the material handling vehicle when the electrical energy generated by actuation of the switch is depleted.

Example 2. The remote control system of Example 1, wherein the energy generating switch is a piezoelectric switch.

Example 3. The remote control system of any one of Examples 1 or 2, wherein the energy storage system is a capacitor bank.

Example 4. The remote control system of any one of Examples 1 to 3, further comprising: a non-energy generating switch, actuation of the non-energy generating switch to send a stop command from the transceiver to the material handling vehicle.

Example 5. The remote control system of any one of Examples 1 to 4, wherein the regulator releases the predetermined amount of energy at a predetermined time interval.

Example 6. The remote control system of any one of Examples 1 to 5, wherein the controller is configured to generate travel commands for the material handling vehicle in response to a first actuation of the energy generating switch.

Example 7. The remote control system of Example 6, wherein the controller is configured to generate stop commands for the material handling vehicle in response to a second actuation of the energy generating switch while the material handling vehicle is moving.

Example 8. The remote control system of any one of Examples 1 to 7, wherein, when the transceiver ceases to transmit travel comments, the material handling vehicle automatically stops traveling.

Example 9. The remote control system of any one of Examples 1 to 8, wherein a single actuation of the energy generating switch generates sufficient electrical energy to power the remote control device for a time period of between 10 seconds and 15 seconds.

Example 10. The remote control system of any one of Examples 1 to 9, wherein the remote control device is configured to transmit redundant packets for each command sent to the material handling vehicle.

Example 11. A method of controlling a material handling vehicle, comprising: generating electrical energy in a remote control device by actuating an energy generating switch; storing the generated electrical energy in an energy storage system; powering a controller with the stored electrical energy to generate commands for the material handling vehicle; transmitting the commands to the material handling vehicle via a transceiver in communication with the controller; in response to receiving the commands, moving the material handling vehicle; ceasing to transmit the commands when the energy storage system is depleted; and in response to ceasing to transmit the commands, automatically stopping the material handling vehicle.

Example 12. The method of Example 11, wherein the energy generating switch is a piezoelectric switch.

Example 13. The method of any one of Examples 11 or 12, further comprising: releasing a predetermined amount of energy from the energy storage system to power the controller and transceiver at a predetermined time interval.

Example 14. The method of any one of Examples 11 to 13, wherein generating commands includes: generating travel commands for the material handling vehicle in response to a first actuation of the energy generating switch.

Example 15. The method of any one of Examples 11 to 14, further comprising: generating stop commands for the material handling vehicle in response to actuation of a second switch on the remote control device.

Example 16. The method of Example 15, wherein the second switch is a non-energy generating switch.

Example 17. A remote control system for a material handling vehicle, comprising: a remote control device with an energy generating switch, the switch to generate electrical energy upon actuation; an energy storage system that stores the electrical energy generated by actuation of the switch; a controller powered by the electrical energy stored in the energy storage system, the controller to: transmit travel commands at a first predetermined time interval to travel the material handling vehicle when energy remains in the energy storage system; and cease transmitting travel commands when the energy in the energy storage system is depleted; wherein the material handling vehicle is configured to automatically stop when the energy storage system is depleted and the controller ceases to transmit travel commands for a second predetermined time interval.

Example 18. The remote control system of Example 17, wherein the second predetermined time interval is about two times greater than the first predetermined time interval.

Example 19. The remote control system of any one of Examples 17 or 18, wherein the controller transmits stop commands to the material handling vehicle in response to actuation of a second switch on the remote control device.

Example 20. The remote control system of any one of Examples 17 to 19, wherein the remote control device is configured to transmit redundant packets for each command sent to the material handling vehicle.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Additionally, unless otherwise specified or limited, the terms "about" and "approximately," as used herein with respect to a reference value, refer to variations from the reference value of plus or minus 15 percent or less, inclusive of the endpoints of the range. Similarly, the term "substantially equal" (and the like) as used herein with respect to a reference value refers to variations from the reference value of less than plus or minus 30 percent, inclusive. Where specified, "substantially" can indicate in particular a variation in one numerical direction relative to a reference value. For example, "substantially less" than a reference value (and the like) indicates a value that is reduced from the reference value by 30 percent or more, and "substantially more" than a reference value (and the like) indicates a value that is increased from the reference value by 30 percent or more.

The previous description of the disclosed embodiments is provided to enable any person skilled in the art to make or use the invention. Given the benefit of this disclosure, various modifications to these embodiments will be readily apparent to those skilled in the art, and the principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A remote control system for a material handling vehicle, comprising:

a remote control device having a housing including an energy generating switch configured to generate electrical energy in response to actuation of the switch;

an energy storage system to store the energy generated by actuation of the switch;

a controller powered by the stored electrical energy and configured to generate commands for the material handling vehicle;

a regulator configured to release a predetermined amount of energy from the energy storage system to power the controller; and a transceiver to transmit travel commands to the material handling vehicle while the electrical energy generated by actuation of the switch powers the controller, and the transceiver to cease transmitting travel commands to the material handling vehicle when the electrical energy generated by actuation of the switch is depleted.

2. The remote control system of claim 1, wherein the energy generating switch is a piezoelectric switch.

3. The remote control system of claim 1, wherein the energy storage system is a capacitor bank.

4. The remote control system of claim 1, further comprising:

a non-energy generating switch, actuation of the non-energy generating switch to send a stop command from the transceiver to the material handling vehicle.

5. The remote control system of claim 1, wherein the regulator releases the predetermined amount of energy at a predetermined time interval.

6. The remote control system of claim 1, wherein the controller is configured to generate travel commands for the material handling vehicle in response to a first actuation of the energy generating switch.

7. The remote control system of claim 6, wherein the controller is configured to generate stop commands for the material handling vehicle in response to a second actuation of the energy generating switch while the material handling vehicle is moving.

8. The remote control system of claim 1, wherein, when the transceiver ceases to transmit travel comments, the material handling vehicle automatically stops traveling.

9. The remote control system of claim 1, wherein a single actuation of the energy generating switch generates sufficient electrical energy to power the remote control device for a time period of between 10 seconds and 15 seconds.

10. The remote control system of claim 1, wherein the remote control device is configured to transmit redundant packets for each command sent to the material handling vehicle.

11. A method of controlling a material handling vehicle, comprising:

generating electrical energy in a remote control device by actuating an energy generating switch;

storing the generated electrical energy in an energy storage system;

powering a controller with the stored electrical energy to generate commands for the material handling vehicle;

transmitting the commands to the material handling vehicle via a transceiver in communication with the controller;

in response to receiving the commands, moving the material handling vehicle;

ceasing to transmit the commands when the energy storage system is depleted; and in response to ceasing to transmit the commands, automatically stopping the material handling vehicle.

12. The method of claim 11, wherein the energy generating switch is a piezoelectric switch.

13. The method of claim 11, further comprising:

releasing a predetermined amount of energy from the energy storage system to power the controller and transceiver at a predetermined time interval.

14. The method of claim 11, wherein generating commands includes:

generating travel commands for the material handling vehicle in response to a first actuation of the energy generating switch.

15. The method of claim 11, further comprising:

generating stop commands for the material handling vehicle in response to actuation of a second switch on the remote control device.

16. The method of claim 15, wherein the second switch is a non-energy generating switch.

17. A remote control system for a material handling vehicle, comprising:

a remote control device with an energy generating switch, the switch to generate electrical energy upon actuation;

an energy storage system that stores the electrical energy generated by actuation of the switch;

a controller powered by the electrical energy stored in the energy storage system, the controller to:

transmit travel commands at a first predetermined time interval to travel the material handling vehicle when energy remains in the energy storage system; and cease transmitting travel commands when the energy in the energy storage system is depleted;

wherein the material handling vehicle is configured to automatically stop when the energy storage system is depleted and the controller ceases to transmit travel commands for a second predetermined time interval.

18. The remote control system of claim 17, wherein the second predetermined time interval is about two times greater than the first predetermined time interval.

19. The remote control system of claim 17, wherein the controller transmits stop commands to the material handling vehicle in response to actuation of a second switch on the remote control device.

20. The remote control system of claim 17, wherein the remote control device is configured to transmit redundant packets for each command sent to the material handling vehicle.

* * * * *